US008032467B1

(12) United States Patent
Chen et al.

(10) Patent No.: US 8,032,467 B1
(45) Date of Patent: Oct. 4, 2011

(54) VALUATION-BASED LEARNING SYSTEM

(75) Inventors: Yang Chen, Westlake Village, CA (US); Qin Jiang, Woodland Hills, CA (US); David Shu, West Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 734 days.

(21) Appl. No.: 12/156,447

(22) Filed: May 31, 2008

(51) Int. Cl.
*G06F 15/18* (2006.01)
(52) U.S. Cl. .......................................................... 706/12
(58) Field of Classification Search .................... 706/12
See application file for complete search history.

(56) References Cited

U.S. PATENT DOCUMENTS

| 6,115,702 | A | 9/2000 | Reiser et al. | |
|---|---|---|---|---|
| 6,125,339 | A | 9/2000 | Reiser et al. | |
| 7,421,419 | B2 * | 9/2008 | Maren | 706/52 |

OTHER PUBLICATIONS

Automated semantic annotation and retrieval based on sharable ontology and case-based learning techniques, Von-Wun Soo; Chen-Yu Lee; Chung-Cheng Li; Shu Lei Chen; Ching-chih Chen; Digital Libraries, 2003. Proceedings. 2003 Joint Conference on Digital Object Identifier: 10.1109/JCDL.2003.1204844 Publication Year: 2003 , pp. 61-72.*
Constructing Grading Information System for Words' Difficulty using a Supervised Learning Method, Chir-Ho Chang; Hung-Jwun Liu; Jin-Ling Lin; Machine Learning and Cybernetics, 2007 International Conference on vol. 7 Digital Object Identifier: 10.1109/ICMLC.2007.4370844 Publication Year: 2007 , pp. 3991-3996.*
KASER: knowledge amplification by structured expert randomization, Rubin, S.H.; Murthy, S.N.J.; Smith, M.H.; Trajkovic, L.; Systems, Man, and Cybernetics, Part B: Cybernetics, IEEE Transactions on vol. 34 , Issue: 6 Digital Object Identifier: 10.1109/TSMCB.2004.835081 Publication Year: 2004 , pp. 2317-2329.*
Application of object-oriented design to Knowledge Amplification by Structured Expert Randomization (KASER), Rubin, S.H.; Rush, R.J., Jr.; Ceruti, M.G.; Object-Oriented Real-Time Dependable Systems, 2002. Proceedings of the Seventh International Workshop on Digital Object Identifier: 10.1109/WORDS.2002.1000072, Pub Year: 2002, pp. 343-349.*
Prakash. P. Shenoy, "A valuation-based language for expert systems," International Journal for Approximate Reasoning, vol. 3(5), pp. 383-411, 1989.
T.M. Strat and J.D. Lawrence, "Explaining evidential analysis," International Journal of Approximate Reasoning, vol. 3, pp. 299-353, 1989.
Hong Xu and Philippe Smets, "Some strategies for explanations in evidential reasoning," IEEE Trans. on SMS-A, vol. 26, No. 5, pp. 599-607, Sep. 1996.
Ronald R. Yager, "Entropy and specificity in a mathematic theory of evidence," International Journal of General Systems, vol. 9, pp. 249-260, 1983. Z. Elouedi, et al., "The evaluation of sensors' reliability and their tuning for multisensory data fusion within the transferable belief model," in Proceedings of 6th European Conference on Symbolic and Quantitive Approaches to Reasoning with Uncertainty (ECSQARU-2001), Sep. 2001, Toulouse, France. pp. 350-361.
Philippe Smets, "Constructing the Pignistic Probability function in a context of uncertainty," In Uncertainty in Artificial Intelligence 5, M. Herion, et al., Eds., Elsevier Science Publishers B.V. (North-Holland), 1990, pp. 29-39.

* cited by examiner

*Primary Examiner* — Michael B Holmes
(74) *Attorney, Agent, or Firm* — Tope-McKay & Assoc.

(57) ABSTRACT

The present invention relates to a valuation-based learning system. The system is configured to receive a plurality of inputs, each input being input evidence corresponding to a variable in a Dempster-Shafer Reasoning System. The Dempster-Shafer Reasoning System is a network of interconnected nodes, with each node representing a variable that is representative of a characteristic of a problem domain. A discount weight is then optimized for assigning to each of the inputs. A basic probability assignment (bpa) is generated using the Dempster-Shafer Reasoning System, and where the bpa is an output for use in determining a solution of the problem domain. Finally, a solution to the problem domain is determined using the bpa.

18 Claims, 4 Drawing Sheets

VALUATION-BASED LEARNING SYSTEM

FIELD OF INVENTION

The present invention relates to a learning system and, more particularly, to a method for learning in a multi-sensor information fusion system using Dempster-Shafer belief functions in a valuation-based system representation.

BACKGROUND OF INVENTION

Information processing and decision support can be accomplished using a learning system. Examples of such systems include U.S. Pat. No. 6,115,702, entitled, "Automatic Determination of Report Granularity" (hereinafter referred to as the '702 patent) and U.S. Pat. No. 6,125,339, entitled, "Automatic Learning of Belief Functions" (hereinafter referred to as the '339 patent).

The '702 patent describes a method for performing statistical classification that resolves conflict in independent sources of information. Such a system resolves the conflict by gathering sets of information representative of features of an object or event; creating basic probability assignments based on the sets of information; determining a coarse information set from the sets of information; performing coarsening on the sets of information; performing linear superposition on each feature; and combining all features to reach a conclusion.

The '339 patent describes automatic learning belief functions that enable the combination of different, and possibly contradictory information sources. The '339 patent uses such functions to determine erroneous information sources, inappropriate information combinations, and optimal information granularities, along with enhanced system performance.

While operable for basic learning systems, the techniques described above only apply to cases where the information sources relate to a single system variable for which a certain decision must be made based on the inputs.

Another prior art reference, entitled, "The evaluation of Sensors' Reliability and their tuning for multisensor data fusion within the transferable belief model," describes a method for tuning sensor input discounting weights in a multi-sensor fusion system. The reference was authored by Zied Elouedi, Khaled Mellouli, and Philippe Smets (Zied et al.), and published in Proceedings of $6^{th}$ European Conference on Symbolic and Quantitative Approaches to Reasoning with Uncertainty (ECSQARU-2001), September 2001, Toulouse, France. pp. 350-361. As was the case with the patents listed above, the approach described by Zied et al. only applies to a single variable system (that is, both the multi-sensor inputs and the outputs of the fusion are on the same variable). Further, Zied et al. does not provide any road map or other references for extending the approach to a multivariable general fusion system.

Another reference, entitled, "Some Strategies for Explanations in Evidential Reasoning," contains formulations for sensitivity analysis. This reference was written by Hong Xu and Philippe Smets, and published in IEEE Trans. on SMC-A Vol. 26, No. 5, pp. 599-607. September 1996. While the authors described formulations for sensitivity analysis, they did not use the formulation for learning.

Thus, a continuing need exists for a learning system that is operable for general reasoning problems utilizing a sensitivity analysis formulation.

SUMMARY OF INVENTION

The present invention relates to a valuation-based learning system. The system includes a computer having a processor or processors configured to perform multiple operations. Such operations include receiving a plurality of inputs, each input being input evidence corresponding to a variable in a Dempster-Shafer Reasoning System. The Dempster-Shafer Reasoning System is a network of interconnected nodes, with each node representing a variable that is representative of a characteristic of a problem domain (e.g., target classification). A (random) variable is one with several possible discrete states. Non-limiting examples in target classification include features, such as color (e.g., red, white, and blue) or size.

A discount weight is optimized for assigning to each of the inputs. A basic probability assignment (bpa) is generated using the Dempster-Shafer Reasoning System. The bpa is an output for use in determining a solution of the problem domain. Thus, the system determines a solution to the problem domain using the bpa and outputs (provides) the solution to a user. It can be appreciated that in some cases, the user may be an actual person, or in other cases, the user could be another system or processor that utilizes the solution further.

Additionally, the processor is configured to perform an operation of receiving a known truth (having characteristics) corresponding to the variable having the probability distribution. The characteristics of the known truth are compared to the probability distribution to generate an error. The weights of the inputs are updated to minimize the error.

The operation of optimizing a discount weight for assigning to each of the inputs further comprises several additional operations. For example, such operations include identifying a set of variables in the Dempster-Shafer Reasoning System. Each variable in the set has at least one input basic probability assignment (bpa). At least one output variable is identified, where the output variable has an output bpa corresponding to the input bpa. A gradient of an objective function is defined in terms of a discounting weight vector, the output bpa, and a partial derivative of the output bpa with respect to the discounting weight vector. An output bpa is calculated for each variable with its input bpa, without discounting, and the results are saved (stored). The output bpa is recalculated for each variable without applying its input bpa, with the results saved (stored). The results obtained in the operations of calculating and recalculating are used to redefine the gradient according to the operation of defining the gradient (mentioned briefly above and in further detail below). The discounting weight vector is then updated. The operations of defining through updating are repeated until convergence of the discounting weight vector. Upon convergence, the weights reflected in the discounting weight vector are optimal weights for use in the act of optimizing a weight to assign to each of the inputs.

In another aspect, the operation of optimizing a discount weight for assigning to each of the inputs further comprises several additional operations. Such operations include identifying a set of variables, each variable having at least one input basic probability assignment (bpa); and identifying at least one output variable, the output variable having output bpa corresponding to the input bpa. Additionally, a gradient of an objective function is defined in terms of a discounting weight vector, the output bpa, and a partial derivative of the output bpa with respect to the discounting weight vector. At an initial time (e.g., time zero), the output bpa without an input bpa being applied is calculated, and the results are saved (stored). For a next input at time k, an output bpa with the input bpa being applied is calculated without discounting, and the results are saved (stored). The gradient is redefined according to the operation of defining the gradient, using the results obtained, at a time and a previous time (e.g., at time k and k−1), in the operation of calculating an output bpa with the input bpa being applied. The discounting weight factor is then updated. Finally, the operations of calculating an output bpa with the input bpa being applied through updating the discounting weight factor are repeated until convergence of the discounting weight factor or until the input is exhausted.

Additionally, in defining a gradient of an objective function in terms of a discounting weight vector, the objective function is based on the combined bpa on a variable X∈U, with variable frame $\Theta_X$, and is defined as:

$$J(\alpha) = \sum_k \sum_l \left[ \sum_j (P_{kl}(a_j) - \delta_{kj})^2 + \lambda * m(\phi) \right],$$

where $P_{kl}$ is an (un-normalized) pignistic probability given by:

$$P_{kl}(a_j) = \sum_{C \subseteq \Theta_X, a_j \in C} \frac{m(C)}{\|C\|}, \forall a_j \in \Theta_X,$$

where m(·) is an un-normalized bpa on the variable frame of $\Theta_X$, and $$\delta_{kj} = \begin{cases} 1 & \text{if } k = j \\ 0 & \text{if } k \neq j \end{cases}$$

represents a given truth *bpa* on a same variable frame, where "ϕ" represents an empty set, m(ϕ) represents mass on conflict as all bpa's refer to un-normalized bpa's, and "‖ ‖" denotes an operator.

Finally, it can be appreciated by one skilled in art that the present invention also comprises a method and a computer program product. The method includes an act of manipulating a computer to perform the operations (acts) described herein. The computer program product comprises computer-readable instruction means stored on a computer-readable medium that are executable by a computer for causing the computer to perform the operations listed herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
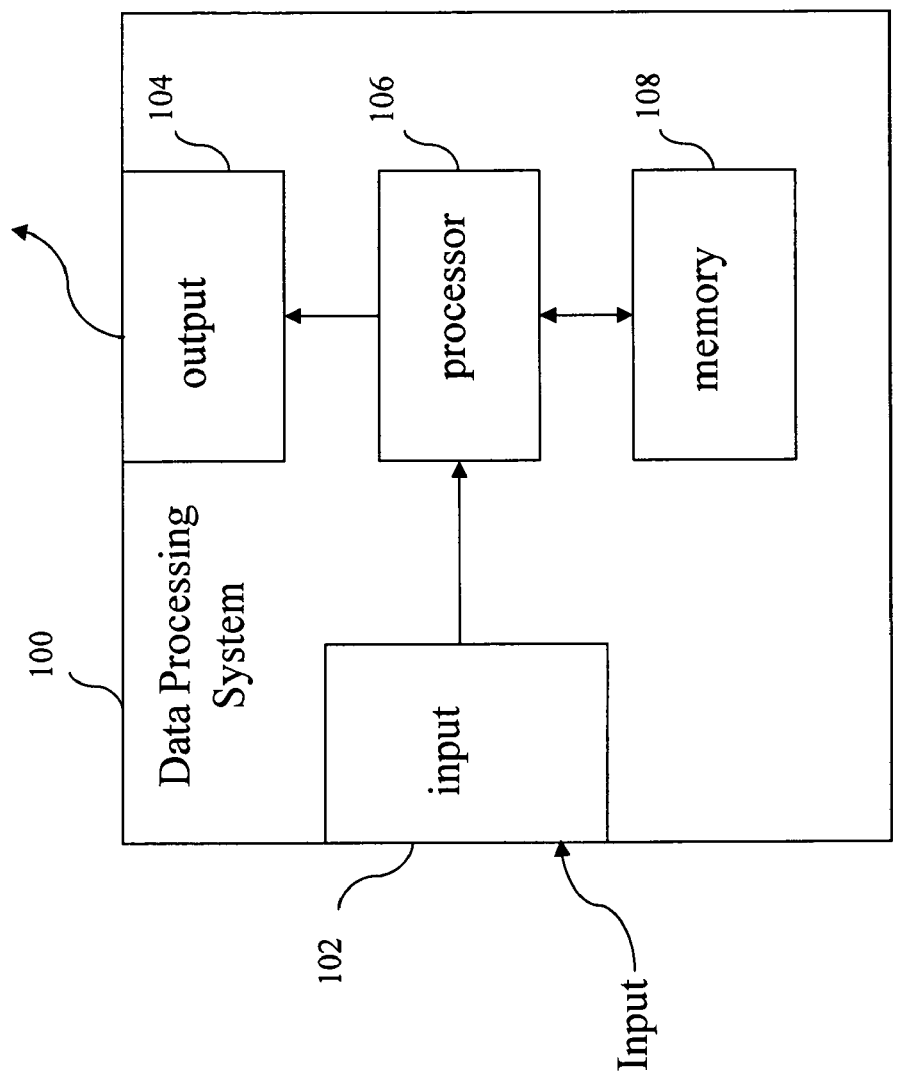
FIG. 1 is a block diagram depicting the components of a learning system according to the present invention.

The present invention relates to a learning system and, more particularly, to a method for learning in a multi-sensor information fusion system using Dempster-Shafer belief functions in a valuation-based system representation. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a glossary of terms used in the description and claims is provided. Next, a description of various principal aspects of the present invention is provided. Subsequently, an introduction provides the reader with a general understanding of the present invention. Next, specific details of the present invention are provided to give an understanding of the specific aspects. Finally, a summary is provided to succinctly summarize the present invention.

(1) GLOSSARY

Before describing the specific details of the present invention, a glossary is provided in which various terms used herein and in the claims are defined. The glossary provided is intended to provide the reader with a general understanding of the intended meaning of the terms, but is not intended to convey the entire scope of each term. Rather, the glossary is intended to supplement the rest of the specification in more accurately explaining the terms used.

Basic Probability Assignment—The term "basic probability assignment" (bpa) generally refers to a form of belief representation in the Dempster-Shafer evidential reasoning function.

Instruction Means—The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a computer-readable medium such as a floppy disk, a CD-ROM, and a flash drive.

Valuation-Based System—The term "Valuation-Based System" (VBS) refers to a reasoning system for simplifying the computation of the marginal belief through so-called local computations. Essentially, the VBS distributes the marginalization operation over certain belief combination operations to reduce the size of the joint frame on which the combinations operate on, hence reducing the overall computation of the reasoning process. A non-limiting example of the VBS approach is that by Prakash Shenoy in "A valuation-based language for expert systems," *International Journal for Approximate Reasoning*, Vol. 3 (5), pp. 383-411, 1989.), which is incorporated by reference as though fully set forth herein.

VBS Kernel—The term "VBS Kernel" refers to an implementation of the VBS framework for uncertainty reasoning using Dempster-Schafer belief functions. It implements the Markov Tree structure, and executes belief propagation to carry out combination operations as defined by the present invention. Further description of the VBS Kernel can be found in a publication by Y. Chen and B. Blyth, entitled, "An Evidential Reasoning Approach to Composite Combat Identification (CCID)," 2004 *IEEE Aerospace Conference*, Big Sky Mont., Mar. 6-11, 2004, which is incorporated by reference as though fully set forth herein.

(2) PRINCIPAL ASPECTS

The present invention has three "principal" aspects. The first is a learning processing system. The learning system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting the components of a learning system of the present invention is provided in FIG. 1. The learning system 100 comprises an input 102 for receiving information from at least one sensor for use in the learning system. Note that the input 102 may include multiple "ports." Typically, input is received from at least one sensor, non-limiting examples of which include video image sensors. An output 104 is connected with the processor for providing information to other systems in order that a network of computer systems may serve as learning system. Output may also be provided to other devices or other programs; e.g., to other software modules, for use therein. The input 102 and the output 104 are both coupled with a processor 106, which may be a general-purpose computer processor or a specialized processor designed specially for use with the present invention. The processor 106 is coupled with a memory 108 to permit storage of data and software that are to be manipulated by commands to the processor 106.

Figure 2:
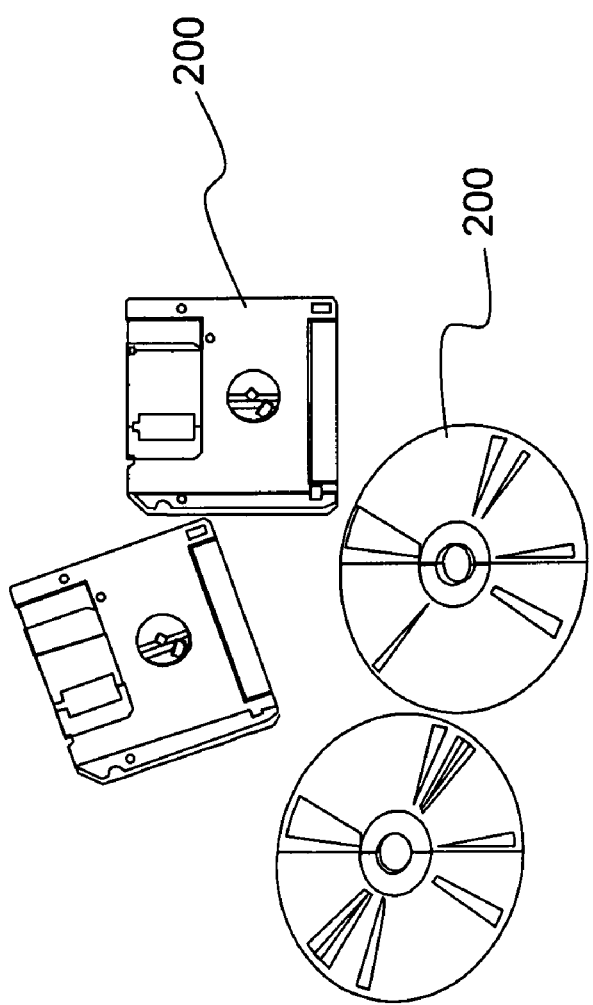
FIG. 2 is an illustration of a computer program product embodying the present invention.

An illustrative diagram of a computer program product embodying the present invention is depicted in FIG. 2. The computer program product 200 is depicted as an optical disk such as a CD or DVD. However, as mentioned previously, the computer program product generally represents computer-readable instructions stored on any compatible computer-readable medium.

(3) INTRODUCTION

The present invention is a method for learning in a multi-sensor information fusion system using Dempster-Shafer (D-S) belief functions in a Valuation-Based System (VBS) representation. The method includes a process to learn optimal discounting weights for fusion system inputs to achieve optimal system performance in terms of classification results. Using a fusion system in VBS provides a powerful representation and reasoning framework that has a large number of real-world applications.

The purpose of this invention is to help design information fusion systems that are robust to information source conflict, distortion in feature characteristics, and mismatch of reasoning system prior knowledge to that present in the input. Since no reasoning/fusion systems are perfect by design, the learning techniques of the present invention provides a fusion system designer a practical tool to optimize system design based on the anticipated inputs. A VBS system using Dempster-Shafer (D-S) calculus has been shown to be more robust and flexible than the prior art. Therefore, the current invention is a very valuable tool for fusion system designers.

The learning and feedback techniques previously developed using Dempster-Shafer (D-S) theory of evidential reasoning were concerned with combining information from different sources and producing a fused result for decision making with robustness against feature distortions. Methods were developed for an unsupervised learning approach (in which the truth of what the correct fusion result should be isn't known at the time) by applying gradient descent optimization with certain error functions appropriate for the specific applications. Furthermore, an information coarsening method was developed. In such a method, belief functions encoding source information are transformed from the original "fine" frame to a hierarchy of layers (from fine-to-coarse) to vacuous frames, by a set of weights. These weights can be adjusted or tuned via the same unsupervised learning method through a gradient descent process.

The methods developed in the prior art, however, have only been shown to work with information sources that relate to the same variable frame. In a more general case, an uncertainty reasoning or sensor fusion problem can be represented by a networked description, and solved using associated methods. The VBS approach by Prakash Shenoy is such a representation (i.e., Prakash. P. Shenoy, "A valuation-based language for expert systems," *International Journal for Approximate Reasoning*, Vol. 3 (5), pp. 383-411, 1989.).

The present invention extends the learning and feedback processes described by Reiser and Chen to problems that can be represented using a general VBS network. Examples of such work by Reiser and Chen include U.S. Pat. No. 6,115, 702, entitled, "Automatic Determination of Granularity" (the '702 patent), issued on Sep. 5, 2000; and U.S. Pat. No. 6,125, 339, entitled, "Automatic Learning of Belief Functions" (the '339 patent), issued on Sep. 26, 2000, both of which are incorporated by reference as though fully set forth herein.

Specifically, an approach developed for sensitivity analysis and its extension to VBS framework is used to identify the contributions of various inputs to the results of an evidential reasoning system represented in a VBS network. Additionally, error measures are quantified and improved upon via a gradient descent optimization process.

Any information processing and decision support systems that require reasoning on the input data and produce data in support of decision making, or makes decisions based on the input data itself, can benefit from the present invention. An example of such a system includes information fusion and decision aids for smart automobiles and vehicle active safety systems. Another example is a target identification and classification system for use in defense applications.

(4) SPECIFIC DETAILS OF THE INVENTION

(4.1) Evidential Reasoning in VBS

Evidential reasoning using Dempster-Shafer belief function can be formulated as finding the marginal of the joint or combined belief, according to the following:

$$m(x) = (\downarrow\{m_A | A \epsilon H\})^{\downarrow X_j}(x), \forall x \subseteq \Theta_{X_j} \quad (1)$$

where $\oplus$ is a binary operator representing the (un-normalized) Dempster's Rule of Combination. In this context, this operator means to combine all its argument basic belief assignments, or basic probability assignments (bpas), one by one. Additionally, m is the marginal belief (in bpa form) on variable $X_j$ that is of interest; $\Theta_{X_j}$ is the variable frame for $X_j$; $U = \{X_1, \ldots, X_r\}$ referring to the set of all variables; operator "$\Theta$" refers to a marginalization operation that will result in beliefs on the variable frame following the operator itself. Furthermore, $H = G \cup F_s$ is the set of subsets (including single variables) on which beliefs are defined in the system; $G = Y_k \{G_k \subset U\}$ denotes the set of subsets of variables on which beliefs are defined; whereas $F = Y_k \{X_k \epsilon U\}$ is the set of singleton variables on which beliefs are defined; and $F_s = Y_k \{\{X_k \epsilon F\}\}$ is the set of singleton variable sets. Additionally, $m_A$ is an input bpa on the (joint) frame of A. Since the bpa's $m_A$ can be on different variable frames, the operation in Equation (1) can involve cylindrical extensions, and combinations on joint frames of variables, which can be computationally very expensive. The Valuation-Based Systems (VBS) theory by Prakash Shenoy provides a basis for simplifying the computation of the marginal belief through so-called local computations. Essentially, the VBS theory states that the marginalization operation can be distributed over certain belief combination operations to reduce the size of the joint frame on which the combinations operate on, hence reducing the overall computation of the reasoning process.

For purposes of the present invention, Equation (1) is a good representation of a non-limiting example of a VBS.

(4.2) Learning in a Valuation-Based System (VBS)

Introduced below is a method for learning in D-S reasoning using a VBS framework. The reliability of information sources is represented via discounting weights, and the discounted input bpa's can be de-weighted or ignored completely. Learning is carried out by setting up objective functions and by using a gradient descent rule to guide the tuning of the discounting weights to optimize the objective functions. The objective functions have the form:

$$J(\alpha) = f(\alpha, m) \quad (2)$$

where $\alpha = \{\alpha_i\}$ is a set of discounting weights corresponding to the set of input bpa's $m_i$; m is the combination of the input bpa's $m_i$ after they are discounted by $\alpha_i \epsilon \alpha$:

$$m = \epsilon_i \{m_i^{(\alpha_i)}\} \quad (3)$$

where $m_i^{(\alpha_i)}$ is the discounted version of $m_i$ defined by:

$$m_i^{(\alpha_i)}(x) = \begin{cases} \alpha_i m_i(x), & x \subset \Theta, x \neq \Theta \\ 1 - \alpha_i + \alpha_i m_i(\Theta), & x = \Theta \end{cases} \quad (4)$$

where $\Theta$ is the variable frame; and $0.0 \leq \alpha_i \leq 1.0$ is a discounting weight. A related term to "discounting weight" is the "discounting factor," which is defined as $(1-\alpha)$, where $\alpha$ is the discounting weight used in the present invention. The discounting operation reduces the effect of the belief represented by the bpa by moving the mass to the vacuous frame $\Theta$ proportionally from other focal elements (subsets of $\Theta$ with non-zero mass). When $\alpha_i$ is 1.0, the discounting effort is null, and Equation (4) results in the original bpa. When $\alpha_i$ is 0.0, the result is a vacuous bpa, with the total mass 1.0 devoted to the vacuous frame $\Theta$. When a bpa is combined with a vacuous bpa, the result is still the original bpa, since there is no new information gained. Since m is a function of $\alpha$, the partial derivatives of Equation (2) can be written as:

$$\frac{\partial J}{\partial \alpha_i} = \frac{\partial f(\alpha, m)}{\partial \alpha_i} \equiv g_i\left(a, m, \frac{\partial m}{\partial \alpha_i}\right). \quad (5)$$

In the prior art, the input bpa's are all constrained to be on a single variable, therefore, one can find analytical expressions for Equation (5), or use numerical means to optimize the objective function.

If the reasoning system consists of belief inputs on different variables and joint variable frames (i.e., relations), the calculation of Equation (5) becomes an obstacle since the exact representation of the partial derivative of m with respect to $\alpha_i$ cannot be easily obtained due to the complicated chain of extension, combination, and marginalization operations.

A key aspect of the present invention is the derivation of the formulas to calculate the partial derivatives, $$\frac{\partial m(x)}{\partial \alpha_i},$$

that are necessary for the calculation of Equation (5).

(4.3) Derivation of the Partial Derivatives

The approach to the calculation of the partial derivatives $$\frac{\partial m(x)}{\partial \alpha_i}$$

is inspired by the work on explaining evidential reasoning using a sensitivity analysis approach. Strat and Lawrence outlined an approach for explaining D-S evidential reasoning results using sensitivity analysis (i.e., Thomas M. Strat and John D. Lawrence, "Explaining Evidential Analyses," International Journal of Approximate Reasoning, Vol. 3, pp. 299-353. 1989), which is incorporated by reference as though fully set forth herein.

In the approach by Strat and Lawrence, the sensitivity of the reasoning outcome is expressed as the partial derivatives of support and plausibility with respect to the discounting weights for the input belief functions to the reasoning process. However, the computation of the partial derivatives is complex and dependent on the structure of the reasoning problem. Therefore, numerical calculations of the partial derivatives are used. Xu and Smets extended the method of Strat and Lawrence to evidential reasoning problems represented in VBS (i.e., Hong Xu and Philippe Smets, "Some Strategies for Explanations in Evidential Reasoning," *IEEE Trans. on SMC-A* Vol. 26, No. 5, pp. 599-607. September 1996), which is incorporated by reference as though fully set forth herein. In their approach, Xu and Smets used the un-normalized belief function and plausibility function, and showed that the sensitivity of the combined bel( ) on a variable $X_j \epsilon U$ to the input belief on $X_i \epsilon F$ is equal to the difference between a) the combined belief bel( ) on when the belief on $X_i$ is included, and b) the combined belief bel( ) when the belief on $X_i \epsilon F$ is excluded.

In the present invention, a set of equations is derived that can be used for the calculation of the partial derivatives, which are different in form than Xu and Smets' (since the present invention uses bpa m( ) while Xu and Smets use belief bel( )). Also, a purpose of the present invention is for learning, while Xu and Smets sought to explain evidential reasoning.

Referring to Equation (3), let $m^{-i}$ be the combined bpa without input $m_i$, and $m^{+i}$ be the combined bpa including $m_i$ but without any discounting. Then, the combined (un-normalized) bpa with discounting applied to $m_i$ can be expressed as:

$$m(x) = a_i(m^{+i}(x) - m^{-i}(x)) + m^{-i}(x), \forall x \subseteq \Theta. \quad (6)$$

This is easily verified since if $\alpha_i$ is 1.0, the above returns $m^{+i}$, whereas if $\alpha_i$ is 0.0, it returns $m^{-i}$. Therefore, the partial derivative of the combined bpa with respect to $\alpha_i$ can be expressed as:

$$\frac{\partial m(x)}{\partial \alpha_i} = m^{+i}(x) - m^{-i}(x), \forall x \subseteq \Theta, \quad (7)$$

which is not dependent on $\alpha_i$ since the relation in Equation (6) is linear. Comparing Equation (1) and (6) provides the following for the VBS version of Equation (6):

$$m(x) = \alpha_i(m^{+i}(x) - m^{-i}(x)) + m^{-i}(x) = \quad (8)$$
$$\alpha_i \Big( (\bigoplus \{m_A | A \in H\})^{\downarrow X_j}(x) -$$
$$(\bigoplus \{m_A | A \in (H - \{X_i\})\})^{\downarrow X_j}(x) \Big) +$$
$$(\bigoplus \{m_A | A \in (H - \{X_i\})\})^{\downarrow X_j}(x), \forall x \subseteq \Theta_{X_j}$$

with $$m^{+i}(x) = (\oplus\{m_A | A \in H\})^{\downarrow X_j}(x), \forall x \subseteq \Theta_{X_j} \quad (9)$$

and $$m^{-1}(x) = (\epsilon\{m_A | A \in (H - \{X_i\})\})^{\downarrow X_j}(x), \forall x \subseteq \Theta_{X_j} \quad (10)$$

The derivative corresponding to Equation (7) becomes:

$$\frac{\partial m(x)}{\partial \alpha_i} = m^{+i}(x) - m^{-i}(x) = (\bigoplus \{m_A | A \in H\})^{\downarrow X_j}(x) - \quad (11)$$
$$(\bigoplus \{m_A | A \in (H - \{X_i\})\})^{\downarrow X_j}(x), \forall x \subseteq \Theta_{X_j}$$

It should be pointed out that Equations (8) and (11) apply not only to input beliefs on single variables, by also apply to input beliefs on joint variables G, E G by virtue of the VBS formalism, which results in the following two equations:

$$m(x) = \alpha_i \Big( (\bigoplus \{m_A | A \in H\})^{\downarrow X_j}(x) - \quad (12)$$
$$(\bigoplus \{m_A | A \in (H - G_i)\})^{\downarrow X_j}(x) \Big) +$$
$$(\bigoplus \{m_A | A \in (H - G_i)\})^{\downarrow X_j}(x),$$
$$\forall x \subseteq \Theta_{X_j}, G_i \in G, \text{ and}$$

$$\frac{\partial m(x)}{\partial \alpha_i} = \quad (13)$$
$$(\bigoplus \{m_A | A \in H\})^{\downarrow X_j}(x) - (\bigoplus \{m_A | A \in (H - G_i)\})^{\downarrow X_j}(x),$$
$$\forall x \subseteq \Theta_{X_j}, G_i \in G.$$

In this situation, $m^{-1}$ (Equation (10)) also needs to be redefined as follows:

$$m^{-i}(x) = (\oplus\{m_A | A \in (H - G_i)\})^{\downarrow X_j}(x), \forall x \subseteq \Theta_{X_j}, G_i \in G. \quad (14)$$

(4.4) Implementation

With Equations (8), (11), (12), and (13), the calculation of the partial derivatives for the objective function in Equation (2) can be easily implemented in a D-S belief system such as the VBS Kernel. For example, the calculation of Equation (9) and (10) (necessary for Equation (8)) can be done by including the input beliefs without discount ((9)), and by excluding the input beliefs altogether, respectively. These steps can be easily achieved in a system such as the VBS Kernel with simple external control logic. Further description of the VBS Kernel can be found in the publication by Y. Chen and B. Blyth, entitled, "An Evidential Reasoning Approach to Composite Combat Identification (CCID)," 2004 *IEEE Aerospace Conference*, Big Sky Mont., Mar. 6-11, 2004, which is incorporated by reference as though fully set forth herein.

(4.5) Methods for Learning in VBS Systems

It is desirable to find the set of discounting weights which optimizes the combined belief m using an objective function of the form shown in Equation (2), according to a gradient descent rule, which depends on the partial derivatives shown in Equation (5) and also shown below for convenience:

$$\frac{\partial J}{\partial \alpha_i} = \frac{\partial f(\alpha, m)}{\partial \alpha_i} \equiv g_i\left(a, m, \frac{\partial m}{\partial \alpha_i}\right). \quad (15)$$

Here the input beliefs are expanded and combined to form m above, to include beliefs on both variables and subsets of variables. Therefore, there will be one discounting weight ($\alpha_i$) for each variable in F (feature variable) and each subset in G. It is clear that Equations (8), (11), (12), and (13) can be used for the calculation of the above partial derivatives in the learning methods.

The goal of learning is to find a so that J is maximized (or minimized) for the input beliefs. It should be noted that the gradient descent rule in the following methods is only used here as examples of how the relations in Equations (8), (11), (12), and (13) can be used. This does not exclude the possibility of using other forms of optimization techniques (such as a genetic algorithm), as long as the equations cited above provide the building blocks towards the optimization.

The specific objective function J can take many forms. There are two different types of learning that can be distinguished based on how J is formed; ones that incorporate known truth to the state of variable of interest Xj with a given input or set of inputs; and ones that do not assume knowledge about the truth. The former approach is referred to as "supervised learning" while the latter approach is referred to as "unsupervised learning." A supervised learning approach incorporates known truth in the objective function J to provide feedback to the learning system with an "error" signal, a non-limiting example of which is provided below (i.e., Section 4.5.1). An unsupervised learning approach forms the objective function without knowledge of the truth state of the variable of interest. Rather, it measures some desired quality of the belief system itself, such as different representations of conflict in the combined belief (as employed in the '702 patent) and can also include as components, entropy, consonance and specificity, as described by Yager (i.e., Ronald R. Yager, "Entropy and specificity in a mathematic theory of evidence," International Journal of General Systems, Vol. 9, pp. 249-260, 1983), which is incorporated by reference as though fully set forth herein.

The following methods assume a VBS Tool (such as the VBS Kernel described by Y. Chen and B. Blyth) is available for the calculation of combined bpa's. The first method, Method One, is intended for the learning of discount weights in a "batch learning" mode in which all training data samples are independent experiments, and it is applicable to objective functions designed for both supervised and unsupervised learning.

Method One:
a. Express $\nabla_\alpha J$ (the gradient of J with respect to $\alpha$) in terms of m(x) and $$\frac{\partial m(x)}{\partial \alpha_i}$$

in Equations (8), (11), (12), and (13);
b. Calculate the combined bpa $m^{+i}$ according to Equation (9) using the VBS Tool. Store the result;
c. For each variable $X_i \epsilon F$, and then for each variable subset $G_i \epsilon G$, calculate $m^{-i}$ defined in Equation (10) or (14) as appropriate using the VBS Tool by disabling the input for $X_i$ or $G_i$ and recalculating the combined bpa. Store the results;
d. Use the results obtained in Acts b and c, and calculate the gradient defined in act a;
e. Update $\alpha$ according to the gradient descent rule; and
f. Repeat Acts b to e, until convergence.

In operation, Method One can be prefaced with the following acts:
a. identifying a set of variables, each variable having at least one input basic probability assignment (bpa); and
b. identifying at least one output variable, the output variable having output bpa corresponding to the input bpa.

Thereafter, Method One includes the following acts, in plain language (which correspond to Acts a through f above):
a. defining a gradient of an objective function in terms of a discounting weight vector, an output bpa, and a partial derivative of the output bpa with respect to the discounting weight vector;
b. calculating an output bpa for each variable with its input bpa, without discounting, and storing the result;
c. recalculating the output bpa for each variable without applying its input bpa, and storing the result;
d. using the results obtained in the acts of calculating and recalculating to redefine the gradient according to the act of defining the gradient;
e. updating the discounting weight vector; and
f. repeating the acts of defining through updating until convergence of the discounting weight vector, and where upon convergence, the weights reflected in the discounting weight vector are optimal weights for use in the act of optimizing a weight to assign to each of the inputs.

Whereas Method One is intended for batch learning, the following method represents an "on-line" version of learning. The following method (i.e., Method Two) assumes that there is a continuous stream of independent input beliefs for the variables in F and variable subsets on $G_i \epsilon G$, presumably based on some feature measurements of a set of different objects. The input beliefs can arrive with no defined order in terms of objects or variables. In such a fusion system, the goal is usually to achieve correct object classification by accumulating independent input beliefs in a recursive fashion. It is assumed that there is an initial set of beliefs available for the variable subsets. The following method suits objective functions designed for unsupervised learning where the truth is unknown at the time of learning.

Method Two:
a. Express $\nabla_\alpha J$ (the gradient of J with respect to $\alpha$) in terms of m(x) and $$\frac{\partial m(x)}{\partial \alpha_i}$$

in Equations (8), (11), (12), and (13);
b. Calculate the combined bpa at time 0, $m_0 = m^{-i}{}_0 = m^{+i}{}_0$, according to Equation (8) using the VBS Tool; Let k→1;
c. For the next input belief at time k, on variable $X_i \epsilon F$, or on variable subset $G_i \epsilon G$, calculate the combined bpa $m^{+i}{}_k$ according to Equation (9), and $m_k$ Equation (8) using the VBS Tool;
d. Use $m^{+i}{}_k$ and $m_{k-1}$ to calculate the gradient defined in Step 1, noting that $m_{k-1}$ is equivalent to $m^{-i}{}_k$ defined in Equation (10);
e. Update $\alpha$ according to gradient decent rule. Let k←k+1; and
f. Repeat Acts c to e until stopped or the input is exhausted.

In operation, Method Two can be prefaced with the following acts:
a. identifying a set of variables, each variable having at least one input basic probability assignment (bpa); and
b. identifying at least one output variable, the output variable having output bpa corresponding to the input bpa.

Thereafter, Method Two includes the following acts, in plain language (which correspond to Acts a through f above):
a. defining a gradient of an objective function in terms of a discounting weight vector, an output bpa, and a partial derivative of the output bpa with respect to the discounting weight vector;
b. at an initial time, calculating the output bpa without an input bpa being applied, and storing the result;
c. for a next input at time k, calculating an output bpa with the input bpa being applied without discounting, and storing the result;
d. redefining the gradient according to the act of defining the gradient, using the results obtained, at a time and a previous time, in the act of calculating an output bpa with the input bpa being applied;
e. updating the discounting weight factor; and
f. repeating the operations of calculating an output bpa with the input bpa being applied through updating the discounting weight factor until convergence of the discounting weight factor or until the input is exhausted.

Rather than trying to find an optimal set of $\alpha$ to achieve optimal J as in Method One, Method Two seeks to achieve a stable set of α that reflects the characteristics of the input beliefs that optimizes J over a set of input beliefs. Secondly, Method Two is also able to make the reasoning system adapt to changes in the input belief characteristics by adjusting α over time. Finally, note that in real applications, it is rare to have belief inputs on variable subsets being updated, so a more restricted version of Method Two could be more applicable for a real application. The restricted version will only receive belief inputs for single variables. Everything else stays the same as described in Method Two.

(4.5.1) Pignistic Probability Based Objective Function

As a non-limiting example of the approach described in previous sections of this invention, an objective function is defined using the pignistic probability of the fusion results and the known truth of the state of the variable of interest. The pignistic probability was further described by Philippe Smets in, "Constructing the Pignistic Probability Function in a Context of Uncertainty," In Uncertainty in Artificial Intelligence 5, M Henrion et al. Eds., Elsevier Science Publishers B.V. (North-Holland), 1990. pp. 29-39, which is incorporated by reference as though fully set forth herein.

The objective function in the present invention is based on the combined bpa on the variable $X \in U$, with variable frame $\Theta_X$, and it can be written as follows:

$$J(\alpha) = \sum_k \sum_l \left[ \sum_j (P_{kl}(a_j) - \delta_{kj})^2 + \lambda * m(\phi) \right], \quad (16)$$

where $P_{kl}$ is the (un-normalized) pignistic probability given by:

$$P_{kl}(a_j) = \sum_{C \subseteq \Theta_X, a_j \in C} \frac{m(C)}{\|C\|}, \forall a_j \in \Theta_X, \quad (17)$$

where $m(\cdot)$ is the un-normalized bpa on the variable frame of $\Theta_X$, and $$\delta_{kj} = \begin{cases} 1 & \text{if } k = j \\ 0 & \text{if } k \neq j \end{cases}$$

represents the given truth *bpa* on the same variable frame.

The notation "φ" represents the empty set, m(φ) represents mass on conflict as all bpa's herein refer to un-normalized bpa's, and the operator "∥ ∥" returns the cardinality of the argument.

The pignistic probability is equivalent to the posterior probability in a Bayesian reasoning system. Hence, the objective function defined here will measure how close the fusion result is to the known truth, represented by the $\delta_{kj}$, and is to be minimized. The second term in Equation (16) is a constraint on the conflict of the reasoning system so that a state that all sensors are fully discounted will not be the answer. The coefficient λ is a constant to balance between the error measure and the conflict term. In the objective function in Equation (16), the index i is for the number of sensors, k is the truth class for the input data set, l is for the number of samples in each class, and j is for the index for the objects (classes) in the frame $\Theta_X$.

(4.5.2) Update Scheme

As described herein, the learning system iteratively updates the discounting weights $\alpha_i$, i=1, 2, 3Λ, n., so that the objective function J(α) reaches its minimal value. The discounting weight $\alpha_i$ is updated by the following equation, which is a non-limiting example of the gradient descent rule:

$$\alpha_i^{n+1} = \alpha_i^n + \mu * \Delta \alpha_i \quad (18)$$

The symbol μ is constant for the step size, and $\Delta \alpha_i$ is computed by the steepest decent technique; that is:

$$\Delta \alpha_i = -\frac{\partial J(\alpha)}{\partial \alpha_i} \quad (19)$$

$$= -\sum_k \sum_l \left[ \sum_j 2(P_{kl}(a_j) - \delta_{kj})(P_{kl}^{+i}(a_j) - P_{kl}^{-i}(a_j)) + \lambda * (m^{+i}(\phi) - m^{-i}(\phi)) \right],$$

where, $m^{+i}$ and $m^{-i}$ are as given in Equations (9) and (10), respectively, and $P_{kl}^{+i}(\alpha_j)$ and $P_{kl}^{-i}(\alpha_j)$ are the pignistic probabilities corresponding to $m^{+i}$ and $m^{-i}$:

$$P_{kl}^{+i}(a_j) = \sum_{a_j \in C, C \subseteq \Theta_X} \frac{m^{+i}(C)}{\|C\|}, \text{ and} \quad (20)$$

$$P_{kl}^{-i}(a_j) = \sum_{a_j \in C, C \subseteq \Theta_X} \frac{m^{-i}(C)}{\|C\|}. \quad (21)$$

(4.5.3) The Derivation of Equation (19)

Equation (16) provides the following:

$$\frac{\partial j(\alpha)}{\partial \alpha_i} = \sum_k \sum_l \left[ \sum_j 2(P_{kl}(a_j) - \delta_{kj}) \frac{\partial P_{kl}(a_j)}{\partial \alpha_i} + \lambda \frac{\partial m(\phi)}{\partial \alpha_i} \right]. \quad (22)$$

Now substitute Equation (8) and (17), and then take the partial derivative with respect to $\alpha_i$ on both sides of the equation, to provide the following equation:

$$\frac{\partial P_{kl}(a_j)}{\partial \alpha_i} = \sum_{a_j \in C, C \subseteq \Theta_X} \frac{1}{\|C\|} (m^{+i}(C) - m^{-i}(C)) \quad (23)$$

$$= P_{kl}^{+i}(a_j) - P_{kl}^{-i}(a_j).$$

Taking the derivative of m(φ) with respect to $\alpha_i$ in both sides of Equation (8), provides the following equation:

$$\frac{\partial m(\phi)}{\partial \alpha_i} = m^{+i}(\phi) - m^{-i}(\phi). \quad (24)$$

Substituting the results of Equations (23) and (24) into Equation (22), results in Equation (19).

(4.5.4) The Existence of Marginal Optimal Solutions

For the objective function defined in Equation (16), it can be shown that a marginal optimal solution exists. That is, $$\frac{\partial^2 J(a)}{\partial \alpha_i^2} > 0. \tag{25}$$

From Equation (23), it is evident that $$\frac{\partial P_{kl}(a_j)}{\partial \alpha_i}$$

is no longer a function of $\alpha_i$. Thus, taking the derivative of $$\frac{\partial J(a)}{\partial \alpha_i}$$

with respect to $\alpha_i$ in both sides of Equation (22), results in the following equation:

$$\frac{\partial^2 J(a)}{\partial \alpha_i^2} = \sum_k \sum_l \left[ \sum_j 2\left(\frac{\partial P_{kl}(a_j)}{\partial \alpha_i}\right)^2 \right] > 0. \tag{26}$$

Since the second derivative is always greater than zero, it is assured that the optimal value for $\alpha_i$, $\alpha_{opt,i}$, for which $$\left.\frac{\partial J(a)}{\partial \alpha_i}\right|_{\alpha_i=\alpha_{opt,i}} = 0,$$

will be guaranteed to achieve the minimal $J(\alpha)$ with respect to $\alpha_i$. In this analysis, since other discounting weights are treated as constants, the minimal value of $J(\alpha)$ might be a local minimum (with respect to all $\alpha_i$). In general, the global minimum (with respect to all $\alpha_i$) may not be achievable through marginal optimal solutions, or may not even exist.

(4.5.6) Implementation Using Pignistic Probability Based Objective Function

In the pignistic probability-based learning system, the discounting weights are first set to some initial values. Then, the error measure is computed using the reasoning results and the ground truth. With the error measure, updated discounting weights are calculated. The system iteratively updates the discounting weights until the objective function, which is defined on the error measure as shown in Equation (16), reaches its optimal value. To make the learning system mathematically tractable, un-normalized combination operations are used in the fusion process.

Figure 3:
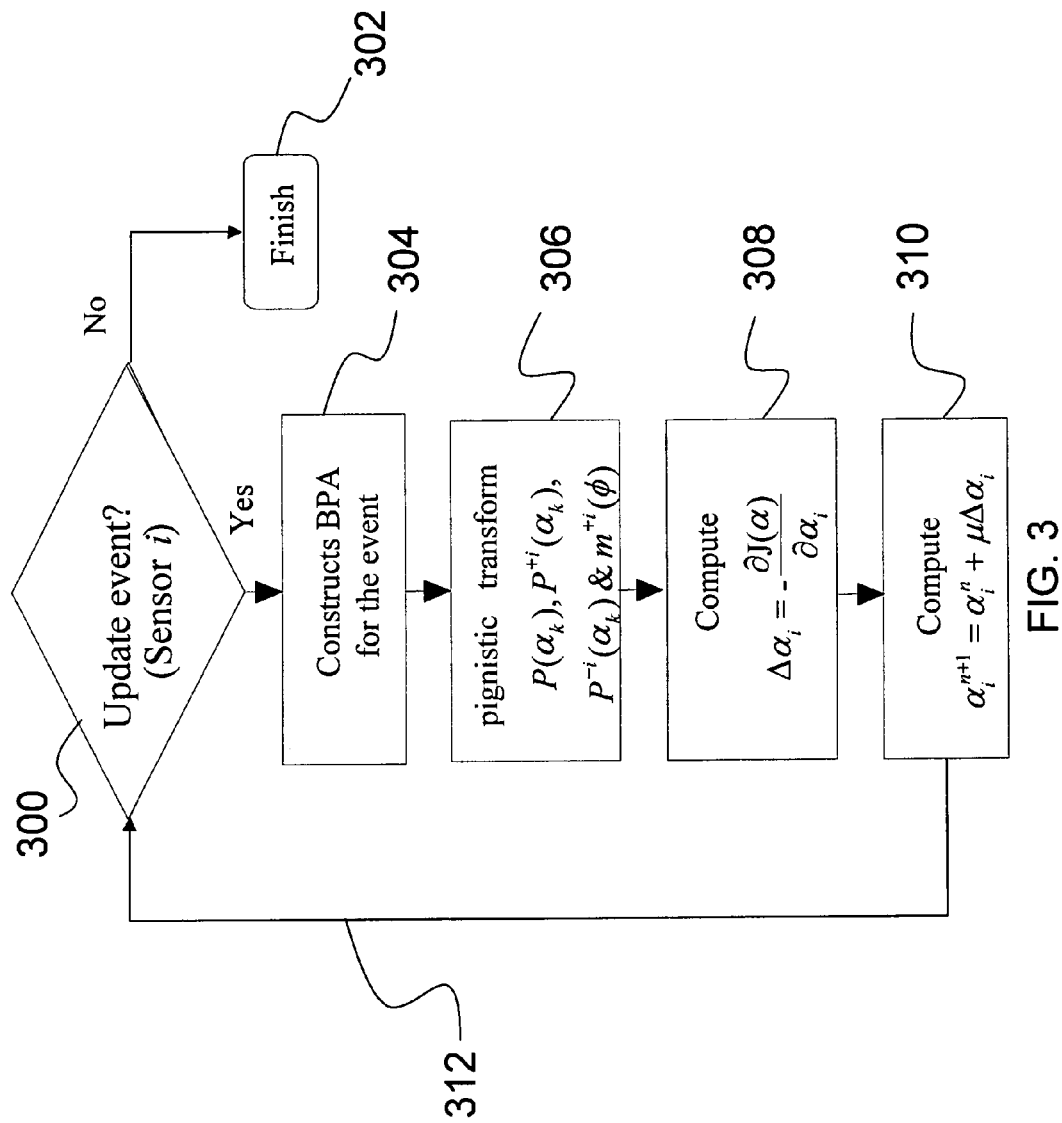
FIG. 3 is a flowchart illustrating a process for discount learning.

FIG. 3 is a flowchart illustrating a learning method using discounted weighting. As illustrated, a sensor 300 and/or other inputs are used to receive an update event. If there is no update event, then the process is completed (i.e., finish) 302. Alternatively, if there is an update event, a bpa is constructed for the event 304. Thereafter, pignistic transformation occurs 306 as listed above. The error measure is thereafter computed 308, which allows the updated discounting weights to be computed 310. As illustrated and stated above, the system iteratively 312 updates the discounting weights until the objective function reaches its optimal value or is below a predetermined threshold.

Figure 4:
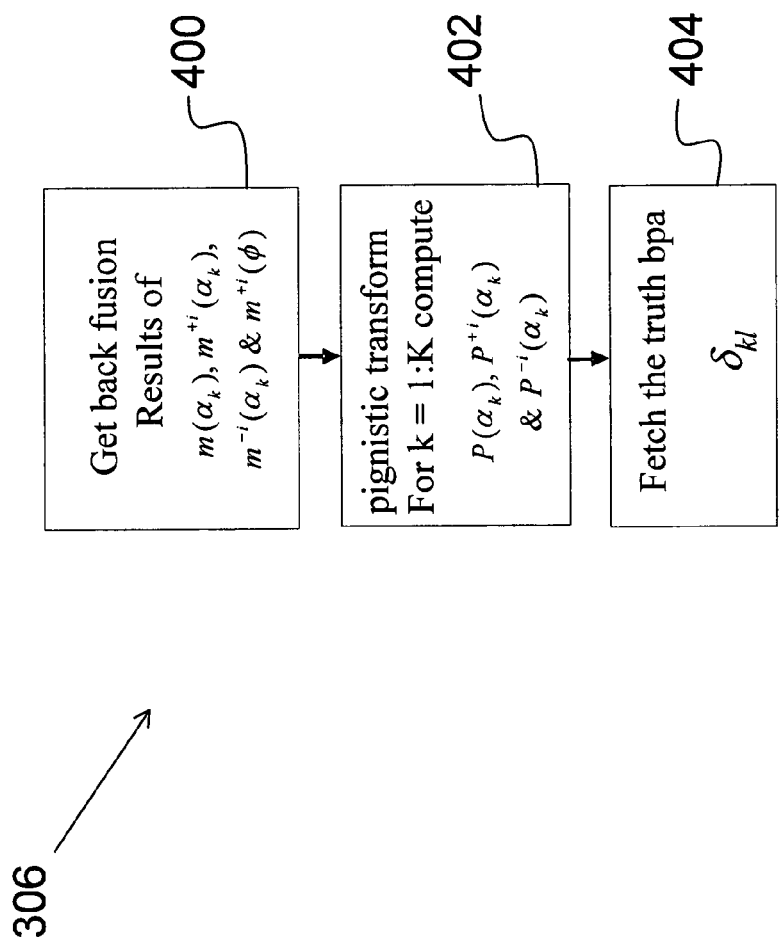
FIG. 4 is a flowchart illustrating pignistic transformation.

FIG. 4 further expands the pignistic transformation block 306 of FIG. 3 into a more detailed flowchart. Thus, FIG. 4 is a flowchart illustrating pignistic transformation 306, where k is a number of classes. The pignistic transformation 306 includes the acts of obtaining the fusion results 400 having bpa's, computing pignistic probabilities 402 from the bpa's (according to equation 17), and fetching the truth bpa 404.

(5) SUMMARY

The present invention provides a computational approach for a valuation-based learning system. The invention includes a method for multi-sensor fusion within a Valuation-Based System (VBS) implementing the Dempster-Shafer belief function. It was shown that the essential computations (i.e., the partial derivatives with respect to the discounting weights) for any learning objective functions using a gradient descent approach can be achieved using a few simple computation steps within a VBS system. Described herein are two possible methods in which the described approach can be implemented. Also described is an embodiment of the present invention implementing a pignistic probability based objective function. This pignistic probability based objective function approach has been shown to be optimal in marginal sense. Test results have shown to be effective in optimizing the sensor discounting weights for single variables.

What is claimed is:

1. A method for learning in a valuation-based learning system, comprising an act of manipulating a computer to perform acts of:
    receiving a plurality of inputs, each input being input evidence corresponding to a variable in a Dempster-Shafer Reasoning System, wherein the Dempster-Shafer Reasoning System is a network of interconnected nodes, with each node being representative of a characteristic of a problem domain;
    optimizing a discount weight for assigning to each of the inputs;
    generating a basic probability assignment (bpa) using the Dempster-Shafer Reasoning System, and where the bpa is an output for use in determining a solution of the problem domain;
    determining a solution to the problem domain using the bpa; and
    providing the solution to a user.

2. A method as set forth in claim 1, further comprising an act of manipulating a computer to perform acts of:
    receiving a known truth corresponding to a variable having a probability distribution, the known truth having characteristics;
    comparing the characteristics of the known truth to the probability distribution to generate an error; and
    updating the weights assigned to the inputs to minimize the error.

3. A method as set forth in claim 1, wherein the act of optimizing a discount weight for assigning to each of the inputs further comprises acts of:
    identifying a set of variables in the Dempster-Shafer Reasoning System, where each variable in the set has at least one input basic probability assignment (bpa);
    identifying at least one output variable, the output variable having output bpa corresponding to the input bpa;
    defining a gradient of an objective function in terms of a discounting weight vector, an output bpa, and a partial derivative of the output bpa with respect to the discounting weight vector;

calculating an output bpa for each variable with its input bpa, without discounting, and storing the result;

recalculating the output bpa for each variable without applying its input bpa, and storing the result;

using the results obtained in the acts of calculating and recalculating to redefine the gradient according to the act of defining the gradient;

updating the discounting weight vector; and repeating the acts of defining through updating until convergence of the discounting weight vector, and where upon convergence, the weights reflected in the discounting weight vector are optimal weights for use in the act of optimizing a weight to assign to each of the inputs.

4. A method as set forth in claim 3, wherein in the act of defining a gradient of an objective function in terms of a discounting weight vector, the objective function is based on the combined bpa on a variable $X \in U$, with variable frame $\Theta_X$, and is defined as:

$$J(\alpha) = \sum_k \sum_l \left[ \sum_j (P_{kl}(a_j) - \delta_{kj})^2 + \lambda * m(\phi) \right],$$

where $P_{kl}$ is an (un-normalized) pignistic probability given by:

$$P_{kl}(a_j) = \sum_{C \subseteq \Theta_X, a_j \in C} \frac{m(C)}{\|C\|}, \forall a_j \in \Theta_X,$$

where $m(\cdot)$ is an un-normalized bpa on the variable frame of $\Theta_X$, and $$\delta_{kj} = \begin{cases} 1 & \text{if } k = j \\ 0 & \text{if } k \neq j \end{cases}$$

represents a given truth *bpa* on a same variable frame, where $\phi$ represents an empty set, $m(\phi)$ represents mass on conflict as all bpa's refer to un-normalized bpa's, and $\| \|$ denotes an operator.

5. A method as set forth in claim 1, wherein the act of optimizing a discount weight for assigning to each of the inputs further comprises acts of:

identifying a set of variables in the Dempster-Shafer Reasoning System, where each variable in the set has at least one input basic probability assignment (bpa);

identifying at least one output variable, the output variable having output bpa corresponding to the input bpa;

defining a gradient of an objective function in terms of a discounting weight vector, an output bpa, and a partial derivative of the output bpa with respect to the discounting weight vector;

at an initial time, calculating the output bpa without an input bpa being applied, and storing the result;

for a next input at time k, calculating an output bpa with the input bpa being applied without discounting, and storing the result;

redefining the gradient according to the act of defining the gradient, using the results obtained, at a time and a previous time, in the act of calculating an output bpa with the input bpa being applied;

updating the discounting weight factor; and repeating the operations of calculating an output bpa with the input bpa being applied through updating the discounting weight factor until convergence of the discounting weight factor or until the input is exhausted.

6. A method as set forth in claim 5, wherein in the act of defining a gradient of an objective function in terms of a discounting weight vector, the objective function is based on the combined bpa on a variable $X \in U$, with variable frame $\Theta_X$, and is defined as:

$$J(\alpha) = \sum_k \sum_l \left[ \sum_j (P_{kl}(a_j) - \delta_{kj})^2 + \lambda * m(\phi) \right],$$

where $P_{kl}$ is an (un-normalized) pignistic probability given by:

$$P_{kl}(a_j) = \sum_{C \subseteq \Theta_X, a_j \in C} \frac{m(C)}{\|C\|}, \forall a_j \in \Theta_X,$$

where $m(\cdot)$ is an un-normalized bpa on the variable frame of $\Theta_X$, and $$\delta_{kj} = \begin{cases} 1 & \text{if } k = j \\ 0 & \text{if } k \neq j \end{cases}$$

represents a given truth bpa on a same variable frame, where $\phi$ represents an empty set, $m(\phi)$ represents mass on conflict as all bpa's refer to un-normalized bpa's, and $\| \|$ denotes an operator.

7. A valuation-based learning system, the system having a processor configured to perform operations of:

receiving a plurality of inputs, each input being input evidence corresponding to a variable in a Dempster-Shafer Reasoning System, wherein the Dempster-Shafer Reasoning System is a network of interconnected nodes, with each node being representative of a characteristic of a problem domain;

optimizing a discount weight for assigning to each of the inputs;

generating a basic probability assignment (bpa) using the Dempster-Shafer Reasoning System, and where the bpa is an output for use in determining a solution of the problem domain;

determining a solution to the problem domain using the bpa; and providing the solution to a user.

8. A system as set forth in claim 7, wherein the processor is further configured to perform operations of:

receiving a known truth corresponding to a variable having a probability distribution, the known truth having characteristics;

comparing the characteristics of the known truth to the probability distribution to generate an error; and updating the weights assigned to the inputs to minimize the error.

9. A system as set forth in claim 7, wherein in the operation of optimizing a discount weight for assigning to each of the inputs, the processor is further configured to perform operations of:

identifying a set of variables in the Dempster-Shafer Reasoning System, where each variable in the set has at least one input basic probability assignment (bpa);

identifying at least one output variable, the output variable having output bpa corresponding to the input bpa;

defining a gradient of an objective function in terms of a discounting weight vector, an output bpa, and a partial derivative of the output bpa with respect to the discounting weight vector;

calculating an output bpa for each variable with its input bpa, without discounting, and storing the result;

recalculating the output bpa for each variable without applying its input bpa, and storing the result;

using the results obtained in the acts of calculating and recalculating to redefine the gradient according to the act of defining the gradient;

updating the discounting weight vector; and repeating the acts of defining through updating until convergence of the discounting weight vector, and where upon convergence, the weights reflected in the discounting weight vector are optimal weights for use in the act of optimizing a weight to assign to each of the inputs.

10. A system as set forth in claim 9, wherein in defining a gradient of an objective function in terms of a discounting weight vector, the objective function is based on the combined bpa on a variable $X \in U$, with variable frame $\Theta_X$, and is defined as:

$$J(\alpha) = \sum_k \sum_l \left[ \sum_j (P_{kl}(a_j) - \delta_{kj})^2 + \lambda * m(\phi) \right],$$

where $P_{kl}$ is an (un-normalized) pignistic probability given by:

$$P_{kl}(a_j) = \sum_{C \subseteq \Theta_X, a_j \in C} \frac{m(C)}{\|C\|}, \forall a_j \in \Theta_X,$$

where $m(\cdot)$ is an un-normalized bpa on the variable frame of $\Theta_X$, and $$\delta_{kj} = \begin{cases} 1 & \text{if } k = j \\ 0 & \text{if } k \neq j \end{cases}$$

represents a given truth bpa on a same variable frame, where $\phi$ represents an empty set, $m(\phi)$ represents mass on conflict as all bpa's refer to un-normalized bpa's, and $\| \|$ denotes an operator.

11. A system as set forth in claim 7, wherein in the operation of optimizing a discount weight for assigning to each of the inputs, the processor is further configured to perform operations of:

identifying a set of variables in the Dempster-Shafer Reasoning System, where each variable in the set has at least one input basic probability assignment (bpa);

identifying at least one output variable, the output variable having output bpa corresponding to the input bpa;

defining a gradient of an objective function in terms of a discounting weight vector, an output bpa, and a partial derivative of the output bpa with respect to the discounting weight vector;

at an initial time, calculating the output bpa without an input bpa being applied, and storing the result;

for a next input at time k, calculating an output bpa with the input bpa being applied without discounting, and storing the result;

redefining the gradient according to the operation of defining the gradient, using the results obtained, at a time and a previous time, in the operation of calculating an output bpa with the input bpa being applied;

updating the discounting weight factor; and repeating the operations of calculating an output bpa with the input bpa being applied through updating the discounting weight factor until convergence of the discounting weight factor or until the input is exhausted.

12. A system as set forth in claim 11, wherein in defining a gradient of an objective function in terms of a discounting weight vector, the objective function is based on the combined bpa on a variable $X \in U$, with variable frame $\Theta_X$ and is defined as:

$$J(\alpha) = \sum_k \sum_l \left[ \sum_j (P_{kl}(a_j) - \delta_{kj})^2 + \lambda * m(\phi) \right],$$

where $P_{kl}$ is an (un-normalized) pignistic probability given by:

$$P_{kl}(a_j) = \sum_{C \subseteq \Theta_X, a_j \in C} \frac{m(C)}{\|C\|}, \forall a_j \in \Theta_X,$$

where $m(\cdot)$ is an un-normalized bpa on the variable frame of $\Theta_X$, and $$\delta_{kj} = \begin{cases} 1 & \text{if } k = j \\ 0 & \text{if } k \neq j \end{cases}$$

represents a given truth bpa on a same variable frame, where $\phi$ represents an empty set, $m(\phi)$ represents mass on conflict as all bpa's refer to un-normalized bpa's, and $\| \|$ denotes an operator.

13. A computer program product for operating a valuation-based learning system, the computer program product comprising computer-readable instruction means stored on a computer-readable medium that are executable by a computer for causing the computer to perform operations of:

receiving a plurality of inputs, each input being input evidence corresponding to a variable in a Dempster-Shafer Reasoning System, wherein the Dempster-Shafer Reasoning System is a network of interconnected nodes, with each node being representative of a characteristic of a problem domain;

optimizing a discount weight for assigning to each of the inputs;

generating a basic probability assignment (bpa) using the Dempster-Shafer Reasoning System, and where the bpa is an output for use in determining a solution of the problem domain;

determining a solution to the problem domain using the bpa; and providing the solution to a user.

14. A computer program product as set forth in claim 13, further comprising instruction means for causing a computer to perform operations of:

receiving a known truth corresponding to a variable having a probability distribution, the known truth having characteristics;

comparing the characteristics of the known truth to the probability distribution to generate an error; and updating the weights assigned to the inputs to minimize the error.

15. A computer program product as set forth in claim 13, further comprising instruction means for causing a computer to perform operations of:

identifying a set of variables in the Dempster-Shafer Reasoning System, where each variable in the set has at least one input basic probability assignment (bpa);

identifying at least one output variable, the output variable having output bpa corresponding to the input bpa;

defining a gradient of an objective function in terms of a discounting weight vector, an output bpa, and a partial derivative of the output bpa with respect to the discounting weight vector;

calculating an output bpa for each variable with its input bpa, without discounting, and storing the result;

recalculating the output bpa for each variable without applying its input bpa, and storing the result;

using the results obtained in the acts of calculating and recalculating to redefine the gradient according to the act of defining the gradient;

updating the discounting weight vector; and repeating the acts of defining through updating until convergence of the discounting weight vector, and where upon convergence, the weights reflected in the discounting weight vector are optimal weights for use in the act of optimizing a weight to assign to each of the inputs.

16. A computer program product as set forth in claim 15, wherein in defining a gradient of an objective function in terms of a discounting weight vector, the objective function is based on the combined bpa on a variable $X \in U$, with variable frame $\Theta_X$, and is defined as:

$$J(\alpha) = \sum_k \sum_l \left[ \sum_j (P_{kl}(a_j) - \delta_{kj})^2 + \lambda * m(\phi) \right],$$

where $P_{kl}$ is an (un-normalized) pignistic probability given by:

$$P_{kl}(a_j) = \sum_{C \subseteq \Theta_X, a_j \in C} \frac{m(C)}{\|C\|}, \forall a_j \in \Theta_X,$$

where $m(\cdot)$ is an un-normalized bpa on the variable frame of $\Theta_X$, and $$\delta_{kj} = \begin{cases} 1 & \text{if } k = j \\ 0 & \text{if } k \neq j \end{cases}$$

represents a given truth bpa on a same variable frame, where $\phi$ represents an empty set, $m(\phi)$ represents mass on conflict as all bpa's refer to un-normalized bpa's, and $\|\ \|$ denotes an operator.

17. A computer program product as set forth in claim 13, further comprising instruction means for causing a computer to perform operations of:

identifying a set of variables in the Dempster-Shafer Reasoning System, where each variable in the set has at least one input basic probability assignment (bpa);

identifying at least one output variable, the output variable having output bpa corresponding to the input bpa;

defining a gradient of an objective function in terms of a discounting weight vector, an output bpa, and a partial derivative of the output bpa with respect to the discounting weight vector;

at an initial time, calculating the output bpa without an input bpa being applied, and storing the result;

for a next input at time k, calculating an output bpa with the input bpa being applied without discounting, and storing the result;

redefining the gradient according to the operation of defining the gradient, using the results obtained, at a time and a previous time, in the operation of calculating an output bpa with the input bpa being applied;

updating the discounting weight factor; and repeating the operations of calculating an output bpa with the input bpa being applied through updating the discounting weight factor until convergence of the discounting weight factor or until the input is exhausted.

18. A system as set forth in claim 17, wherein in defining a gradient of an objective function in terms of a discounting weight vector, the objective function is based on the combined bpa on a variable $X \in U$, with variable frame $\Theta_X$, and is defined as:

$$J(\alpha) = \sum_k \sum_l \left[ \sum_j (P_{kl}(a_j) - \delta_{kj})^2 + \lambda * m(\phi) \right],$$

where $P_{kl}$ is an (un-normalized) pignistic probability given by:

$$P_{kl}(a_j) = \sum_{C \subseteq \Theta_X, a_j \in C} \frac{m(C)}{\|C\|}, \forall a_j \in \Theta_X,$$

where $m(\cdot)$ is an un-normalized bpa on the variable frame of $\Theta_X$, and $$\delta_{kj} = \begin{cases} 1 & \text{if } k = j \\ 0 & \text{if } k \neq j \end{cases}$$

represents a given truth bpa on a same variable frame, where "$\phi$" represents an empty set, $m(\phi)$ represents mass on conflict as all bpa's refer to un-normalized bpa's, and $\|\ \|$ denotes an operator.

* * * * *